Oct. 22, 1940.    Y. C. LE GUILLOU    2,218,825
BALL RETRIEVER AND THE LIKE
Filed April 5, 1938
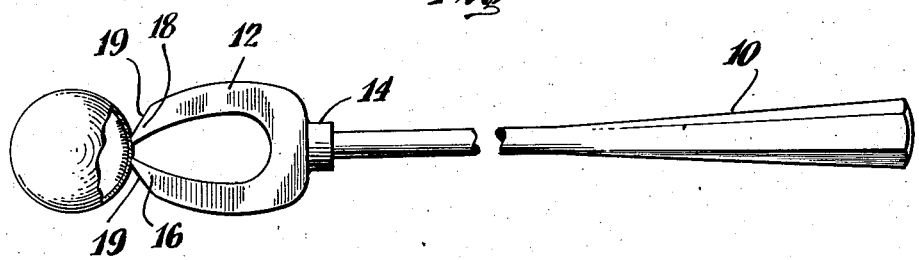
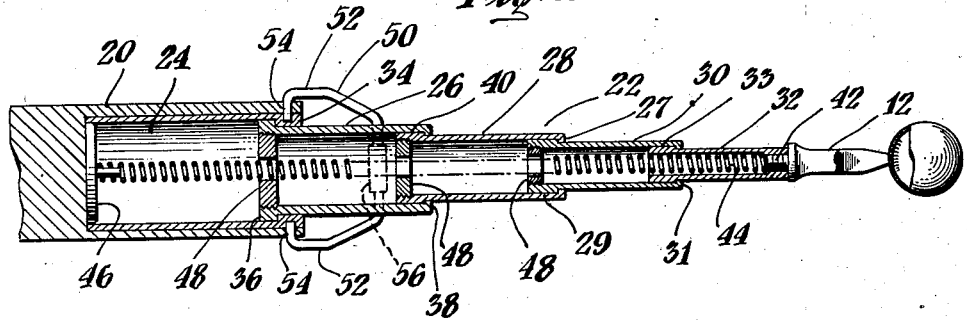
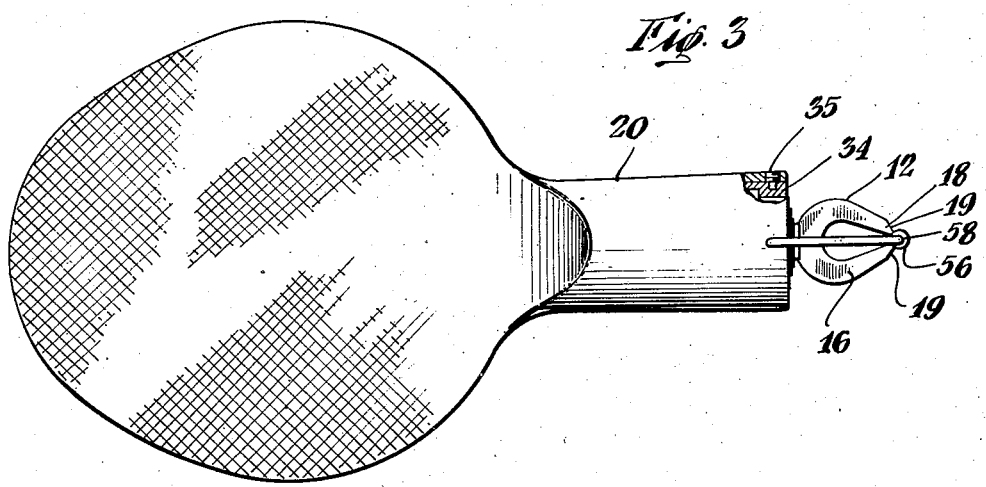
INVENTOR
Yves C. Le Guillou
BY
Sidney A. Ochs
ATTORNEY Patented Oct. 22, 1940

2,218,825

UNITED STATES PATENT OFFICE 2,218,825

BALL RETRIEVER AND THE LIKE

Yves C. Le Guillou, New York, N. Y.

Application April 5, 1938, Serial No. 200,167

8 Claims. (Cl. 294—19)

This invention relates to ball retrievers and particularly relates to ball retrievers for table tennis and the like amusement devices and parlor games.

The principal object of my invention is to provide a ball retriever with a magnetic head adapted to attract to it and hold a ball including in its structure a magnetically susceptible substance responsive to the field of influence of the magnetic head.

Another object is to provide a ball retriever having a magnetic head and a telescoping extension carrying said head.

A further object is to provide a table tennis bat having a ball retriever substantially concealed in the handle thereof.

Another object of my invention is to provide a ball retriever comprising a handle and a permanent magnet head of horseshoe type, the legs of said magnet being so shaped and having such position as to produce a strong magnetic field for acting upon a magnetically susceptible ball.

An additional object is to provide a ball retriever having an electro-magnet capable of being energized to attract a magnetically susceptible ball or the like.

A further object is to provide a permanent magnet ball retriever movable relative to a carrying handle supporting the same and including a combination latch and keeper for said magnet.

Another object is to provide a magnetic ball retriever for magnetically susceptible balls of the character described in my copending application, Serial No. 200,168 filed April 5, 1938.

These and other objects of my invention relating to the improved ball retriever will in part be obvious and in part be pointed out in the subsequent detailed description and the claims and in the accompanying drawing which however must be considered as merely illustrating a preferred embodiment of the invention and in no way limiting the invention to the specific embodiments shown and described. It will be understood that all modifications including features of construction, combinations of elements and arrangement of parts are contemplated.

In the accompanying drawing:

Fig. 1 is a view of a permanent magnet ball retriever of the invention;

Fig. 2 is a view of a permanent magnet ball retriever associated with a table tennis bat and having its magnetic head in extended position, and holding a table tennis ball that is magnetically susceptible and Fig. 3 is a view of the ball retriever mechanism in collapsed position and showing a latch and keeper in association with the magnetic head.

Referring to Figs. 1-3 inclusive wherein similar numerals indicate similar parts of the structure, the ball retriever may comprise a handle 10, and a magnet 12 fixed to the end of the handle by a hub extension 14. The magnet is preferably a permanent magnet and preferably of the horseshoe type having poles 16 and 18 respectively which are bent round so as to approach one another and thus provide two poles to attract a ball including a magnetically susceptible substance. A magnet of this character possesses a force of attraction and lifting power in its combined poles that is much greater than that of a bar magnet having poles at opposite ends. This greater power is of considerable assistance in retrieving balls from substantially inaccessible places where the retriever just about reaches but does not actually contact the ball. It is further preferred that the magnet 12, be of the laminated type consisting of laminae of steel separately magnetized and afterwards bound together in bundles. A magnet of this type has the advantage of being more powerful in proportion to its weight than thicker solid magnets and enables me to provide a non-bulky head having considerable magnetic pull. Furthermore, the magnet of my invention preferably has its adjacent legs 16 and 18 in such relation that the gap at the pole extremities is small. Also, the pole ends of the magnet are chamfered as at 19, the two poles forming together a pointed stub adapted to readily contact a magnetically susceptible ball. Such enables contact of both poles with a ball surface and provides contact with that portion of the magnet where the field strength is greatest. Also it provides a stable ball carrying means that would hardly be possible with a single pole magnet (i. e. a bar magnet).

In Fig. 2 the magnetic head 12, is associated with the handle 20 of a table tennis bat and may be fixed thereto in any suitable manner. The handle may be of wood, a phenol-condensation product or a non-magnetic metal. The magnet preferably forms part of a telescoping extension 22 that may be concealed in the hollow, preferably cylindrical bore 24 of said handle.

The telescoping extension comprises a plurality of tubes preferably of circular section, for instance the tubes 26, 28, 30 and 32, preferably of a light weight non-ferrous metal for instance aluminum or a light gauge brass or bronze. The tube 26, is slidably journaled in a bearing sleeve 34 which fits the bore of the handle 20, and is positioned at the open end thereof. The sleeve 34 is of sufficient length to provide good bearing for the extension when in the extended position and is held in the handle by three dowel screws 35 equally spaced circumferentially. The base end of the tube 26 has a flat head 36, of equal diameter to the bore of the handle. This serves as a guide shoe when the tube is moved in and out of the handle and as a limit stop when the tube is fully extended. The opposite end of the tube 26 has a turned-in annular lip 38 providing a stop for the tube 28. The tube 28 has a bearing portion 40 at its base end slidably fitted in the inner surface of the tube 26 and has an inturned lip 27 at the opposite end. The tube 30 is constructed similarly to tube 28 but is of reduced section. It telescopes with the tube 28 and is provided with a bearing shoulder portion 29 and an inturned stop lip 31. The end tube 32 has a bearing portion 33 journalled in the tube 30 and carries in its tip the horseshoe magnet 12. The magnet may be mounted in the tube as by the shank 42, which may be threaded or pinned with respect to the end of the tube. The aforesaid tube sections may be of similar length but in the disclosed embodiment will preferably be shorter in each succeeding outward section to obtain a flush assembly when the extension is collapsed.

In order to maintain the telescoping sections in extended position suitable spring held pins may be provided to engage suitable recesses in the base shoulders of the respective tubes or section. However, I preferably maintain the sections in outward position by a compression spring 44. This spring also functions to rapidly extend the telescope to operating position when released. The spring is carried in the hollow of the handle and tube sections. In order to centralize the spring in the handle I provide a spring stud 46 having a base portion seated at the bottom of the handle bore and a projecting central tip over which the spring is forced. The opposite end of the spring is substantially centralized by the tube 32 which is not of much greater inner diameter than the outer dimension of the spring. To prevent buckling of the spring I provide suitable guide furrules 48 at the base of tube sections 26, 28 and 30. The ferrules are threaded into the end of these members.

A novel feature of the invention comprises the means I use to maintain the extension 22 in collapsed position against the action of the spring 44 and to protect the magnet 12 from loss of power. Thus I provide a combination latch and keeper 50 of semi-ring or yoke-like character journaled in the handle 12 and adapted to swing past the end of the handle. The member 50 preferably comprises opposite arm portions 52, inturned bearing tips 54 rotatable in suitable journals in the handle 20, and a cross bar 56 integral with the arms 52 and preferably of soft iron. The bearing tips preferably lie on an axis normal to the face of the magnet so that when the extension is collapsed the cross bar bridges the gap between adjacent poles of the magnet the adjacent tips of the poles being slightly rounded to obtain a good seating of the cross-bar and a lock. Where desired the bar 56 may include a loose collar 58 of soft iron. In certain instances it may be desired to have the cross-bar 56 in the same plane as the magnet. To obtain a good catch and lock it is preferred that the pole ends be slightly notched to obtain a good lock.

According to either construction, to release the extension it is merely necessary to push the ring over the high point of the magnet poles and let the spring 44 send the extension outward.

It will be understood that while I have described and prefer to use a permanent magnet in my invention I may employ an electro-magnet. Such however requires a source of electrical energy and is substantially equivalent to a bar magnet. Obviously an electro-magnet could be carried in the tube section 32, the winding being inside or outside the tube.

In order that those skilled in the art to which my invention appertains may have some idea of the strength of magnet to be used, I have obtained good results in retrieving table tennis balls containing a loose magnetically susceptible powder, with a permanent horseshoe magnet having a pull of about 125 or more grains (avoirdupois).

From a consideration of the foregoing description of my invention it will be evident that I have made a new and novel ball retriever useful for many games and devices. It will be understood that various changes and modifications will suggest themselves to those those skilled in the art without departing from the spirit of my invention. I therefore desire to secure for myself all modifications and equivalent constructions falling within the spirit and scope of my invention as expressed in the foregoing description, and I desire the invention to be construed to cover all equivalents and as broadly as the claims taken in conjunction with the prior art may allow.

I claim:

1. A device for retrieving magnetically susceptible balls and the like comprising a U-shaped magnetic head; the adjacent legs of said U being in close proximity at their free ends and carrying means for said head secured to the base of said U, said carrying means having an iron keeper secured thereto by hingeing and adapted to be positioned across the poles of the magnet when not in use.

2. A device for retrieving balls and the like including in their structure a magnetically susceptible substance, comprising a magnet, a carrying member, and a longitudinally extensible element supported by said carrying member and connected to said magnet and a latch to retain said extensible element in non-extended position.

3. A device for retrieving balls and the like including in their structure a magnetically susceptible substance, comprising a carrying member having a hollow recess at one end, an extension slidably journaled in said recess, a horse-shoe type magnet supported by the outer end of the extension and a latch mounted on said carrying member adapted to engage said magnet and hold said extension in its in-position with respect to said carrying member recess.

4. A device for retrieving balls and the like including in their structure a magnetically susceptible substance, comprising a carrying member, a plurality of telescoping elements, the outermost of said elements being slidably journaled in said carrying member, the innermost of said elements having a magnet secured thereto, said magnet having a pair of closely related poles and resilient means adapted to maintain said elements in extended position.

5. A device for retrieving balls and the like including in their structure a magnetically susceptible substance, comprising a carrying member, a collapsible extension journaled in said carrying member, a magnet carried by said extension, a latch on said carrying member to retain said extension in collapsed position, a portion of said latch engageable with said magnet and providing a keeper therefor.

6. A device for retrieving balls and the like including in their structure a magnetically susceptible substance, comprising a carrying member, an elongated recess in one end of said carrying member, a tubular member slidably journaled in said recess, a plurality of tubes connected with said first named tube, each tube being of successively smaller section and being journaled in its adjacent large tube, a permanent horseshoe type magnet carried by the tube of least section, resilient means to hold said tubes in extended position, and a yoke hinged on said carrying member and adapted to interlock with said magnet when said tubes are collapsed, said yoke including an iron keeper for said magnet.

7. A device for retrieving objects including in their structure a magnetically susceptible substance, comprising a carrying member, an extension slidable longitudinally in said carrying member, a magnet carried by said extension and a latch to retain said extension in its in-position.

8. A device for retrieving balls and the like comprising a carrying member, an elongated recess in one end of said member, a collapsible extension journaled in said recess comprising a plurality of telescoping tubes, means on the innermost tube for retrieving balls, a helical spring within said tubes to hold said tubes in extended position and spring centralizing means on said carrying member and extension to prevent buckling of said spring.

YVES C. LE GUILLOU.